Figure 1:
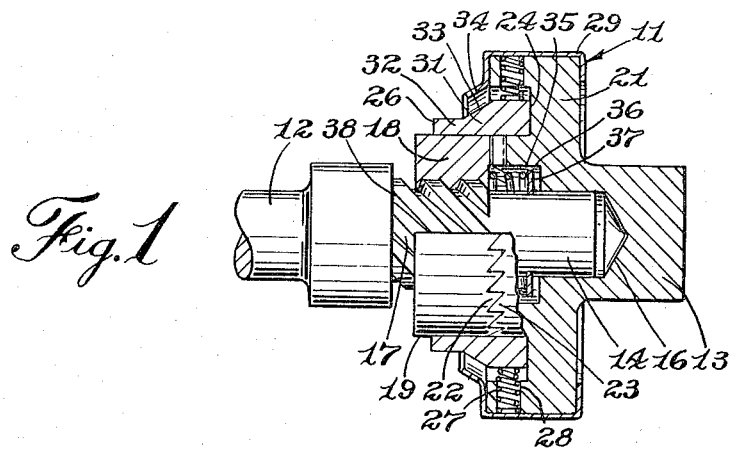

Feb. 28, 1967   J. W. POLISEO   3,306,406
OVERRUNNING CLUTCH WITH SPEED RESPONSIVE RETARDER
AND INTERMEDIATE COUPLING
Original Filed Feb. 11, 1963

WITNESS:
Esther M. Stockton

INVENTOR.
Joseph W. Poliseo
BY
William S. Thompson

ATTORNEY

United States Patent Office 3,306,406
Patented Feb. 28, 1967

---

3,306,406
OVERRUNNING CLUTCH WITH SPEED RESPONSIVE RETARDER AND INTERMEDIATE COUPLING
Joseph W. Poliseo, Elmira, N.Y., assignor to The Bendix Corporation, Elmira, N.Y., a corporation of Delaware
Original application Feb. 11, 1963, Ser. No. 257,572, now Patent No. 3,181,673, dated May 4, 1965. Divided and this application Dec. 16, 1964, Ser. No. 418,614
1 Claim. (Cl. 192—46)

The present application is a divisional application of my co-pending patent application Serial No. 257,572, filed February 11, 1963, entitled "Self-Energizing Overrunning Clutch With Speed Responsive Retarder" and now Patent No. 3,181,673.

The present invention relates to a self-energizing overrunning dentil clutch and more particularly to a clutch coupling incorporating centrifugally actuated retarder means supported on the driven clutch member for energizing the driving clutch member.

Self-energizing dentil overrunning clutch connections, such as are shown in the Miller Patent 3,016,122 issued January 9, 1962, assigned to the assignee hereof, have been generally satisfactory but because of the several structural elements utilized to attain clutch separation, it has been found that clutches of this type are difficult to balance quickly and effectively. Also the use of several structural elements necessarily increases the production and fabrication costs of a clutch of this type.

It is, therefore, an object of the present invention to provide a self-energizing dentil overrunning clutch which is facile, durable, efficient, dependable, and economical to produce and fabricate.

It is another object of the present invention to provide a self-energizing clutch which combines a retarder and centrifugal actuator means for the retarder into a single effective structural element.

It is still another object of the present invention to provide a clutch having most of the clutch elements affecting clutch balance positioned on the driving or low speed side of the clutch thereby materially aiding in balancing the driven or high speed side of the clutch.

It is a further object of the present invention to provide a device which is particularly well adapted for use with a prime mover for gas turbines and the like.

With the above and other objects in view which will appear as the description proceeds, this invention resides in the novel construction, combination and arrangement of parts substantially as hereinafter described or particularly defined in the appended claim, it being understood that such changes in the precise embodiment of the herein disclosed invention may be made as come within the scope of the claim.

Figure 2:
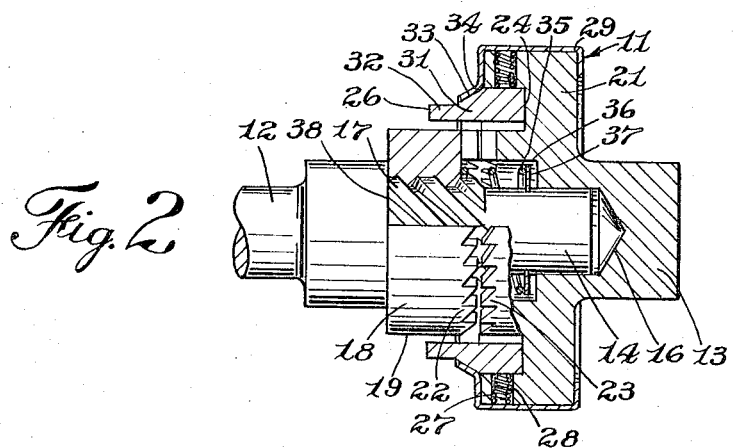
Figure 3:
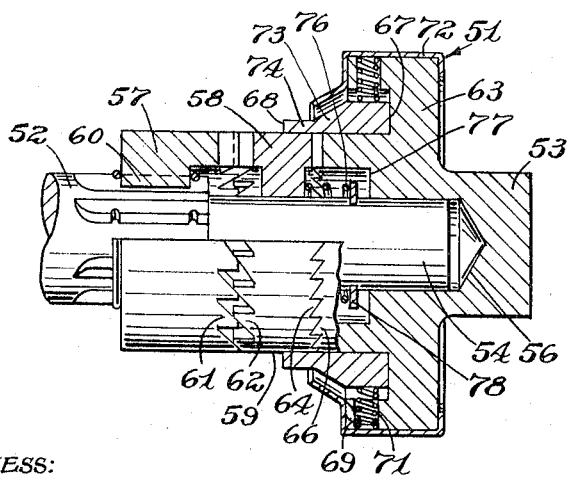

The accompanying drawing illustrates two embodiments of the invention constructed according to the best mode so far devised for the practical application of the principles thereof, and in which:

FIGURE 1 is a side elevational view, partly broken away and in section, illustrating a preferred embodiment of the invention, the clutch being shown in a driving condition with the centrifugal retarders in a retarding position;

FIGURE 2 is a side elevational view similar to FIGURE 1 but showing the clutch members and the centrifugal retarders in disengaged positions; and, FIGURE 3 is a side elevational view of a second embodiment of the invention, broken away and in section, showing the clutch members in an engaged condition responsive to the wedging action of an intermediate coupling member and further showing the centrifugal retarders in a retarding position.

Referring now more particularly to the accompanying drawing in which like reference characters indicate like parts, numeral 11 generally designates a clutch for coupling a driving shaft 12 of a prime mover such as a starting motor to an aligned driven shaft 13 of a turbine or the like. The driving shaft is reduced in diameter as at 14 and is journalled for pilot action only in the bore 16 formed in the driven shaft. Total separation of the device being started from its prime mover is often desirable and in those instances the journalled relationship between the shafts can be eliminated. As the description proceeds it will become apparent to those skilled in the art that in those special applications during clutch disengagement there will be complete separation between the driving and driven elements thereby providing a clutch which is totally free of frictional engagement during clutch disengagement. Even in those cases where the shafts are journalled for pilot action the only contact between the driving and driven elements during disengagement will be the journalling connection which introduces but minimal frictional losses. A portion of the reduced diameter of the driving shaft is provided with helical splines or threads 17 upon which a nut-like driving clutch member 18 is threaded. The driving clutch exterior provides a smooth cylindrical surface 19.

A driven clutch member 21 in the form of a radial flange is fixedly secured to the driven shaft. The opposing faces of the driving and driven clutch elements are provided with complementing interengaging overrunning dentil teeth 22 and 23, respectively.

Radially outwardly of the dentils 23 there is formed one or more openings 24 in which centrifugal weight means 26 are positioned. The weight members 26 are non-rotatably secured to the driven clutch element but the opening 24 has sufficient radial height to permit limited radial movement of the weight members. A spring 27 disposed in a cavity 28 is compressively confined between a cover member 29 and the weight member to normally bias the weight member to its innermost radial position. The weight members comprise the main body portion 31 with the major portion of the main body portion positioned within the opening 24. The speed at which centrifugal actuation is desired and the axial depth of the opening 24 determine the size of the portion 31. An elongated arm 32 extending from the main body portion overlies the cylindrical portion of the driving clutch member to frictionally engage the driving clutch surface 19 when the weight member assumes its radially innermost position. In the event more mass is desired in the centrifugal weight members than can be comfortably fitted within the opening 24, then the weight arm can be angularly tapered as at 33 to provide the desired extra mass. The cover edge is flared as at 34 to protect portions of the weight member and its projecting arm.

A spring 35 is supported on the driving shaft in a recess 36 of the driven clutch member to be compressively confined between the driving clutch member and a retaining ring 37.

In operation, when both the driving and driven shafts 12 and 13, respectively, are stopped, the driving clutch member 18 will be urged by the compression spring 35 into abutting engagement with the shoulder 38 adjacent the heel end of a helical spline 17. The centrifugal weight members 26 will be biased by the compression springs 27 to their radially innermost position thereby causing the weight arms 32 to engage the cylindrical surface 19 of the driving clutch. Upon rotation of the driving shaft the frictional engagement of the driving clutch and the centrifugal weight members, combined with the inertia of the driving clutch member, will cause the driving clutch member to be threaded on the helical splines toward driving engagement with the driven clutch member 21. Driving engagement between the clutch members will continue until such time as the driven shaft rotates at a speed greater than the speed of the driving shaft at which time the dentil clutch teeth 22, 23 will be cammed apart and overrun in a normal fashion. At a predetermined speed, generally a speed above a synchronous speed, centrifugal force generated by the speed of rotation of the driven shaft will actuate the weight members to their radially outermost position against the bias of the springs 27 thereby causing the weight arms 32 to disengage from the driving clutch and remove the clutch retarding forces. The clutch spring 35 will then assert itself and return the driving clutch member to the starting or declutched position. This condition will subsist so long as the driven shaft overruns the driving shaft. In the event of a false start the extent of the overrun will not normally be of long enough duration to cause the centrifugal weights to be actuated, or if the centrifugal weights are displaced, they will almost immediately return to the retarding position thus reengaging the driving clutch member's surface and reestablishing the retarding relationship therebetween. This retardation will again thread the driving clutch member back into a clutch engaged condition.

A second embodiment of the invention is illustrated in FIGURE 3 wherein a clutch generally designated 51 couples a driving shaft 52 to an aligned driven shaft 53. The driving shaft is reduced in diameter as at 54 and has its extremity journalled in the bore 56 formed in the driven shaft. A driving coupling member 57 is secured by splines 60 to the driving shaft while an intermediate coupling member 58 is slidably journalled on the reduced diameter portion of the driving shaft. The intermediate coupling member's exterior provides a smooth cylindrical surface 59. Cooperating axially inclined torque transmitting teeth 61, 62 are formed on the driving and intermediate coupling members, respectively.

A driven clutch member 63 in the form of a radial flange is fixedly secured to the driven shaft. The axial extremity of the intermediate coupling member adjacent the driven clutch member provides the driving clutch member. The opposite faces of the driving and driven clutch members are provided with complementing interengaging overrunning dentil teeth 64, 66, respectively.

Radially outwardly of the dentils 66 there is formed one or more openings 67 in which centrifugal weight members 68 are positioned. As in the previous embodiment, the weight members are nonrotatably secured to the driven clutch member but the opening 67 has sufficient radial height to permit limited radial movement of the weight members. A spring 69 disposed in the cavity 71 communicating with the opening 67 is compressively confined between a cover 72 and a weight member to normally bias the weight member to its radially innermost position. The weight members are identical to those previously described in that they comprise a main body portion 73 supported within the opening 67 and an elongated projection or arm 74 which overlies the cylindrical surface 59 of the intermediate coupling member for frictional engagement therewith when the weight members assume their radially innermost position.

A compression spring 76, supported on the driving shaft in a recess 77 of the driving clutch, is compressively confined between the intermediate coupling member and a retaining ring 78.

In operation, when both the driving and driven shafts 52, 53, respectively, are stopped, the intermediate coupling member 58 will be urged by the compression spring 76 toward the fixed coupling member 57 causing the coupling teeth 61, 62 to telescope. Centrifugal weight members 68 will be biased by the springs 69 to their radially innermost position causing the weight arms 74 to engage the cylindrical surface 59 of the intermediate coupling member. Upon rotation of the driving shaft the frictional engagement between the intermediate coupling member and the centrifugal weight members combine with the torque transmitting teeth 61, 62 to cause the intermediate coupling member and driving clutch member to be wedged toward the driven clutch member 63. Driving engagement between the clutch members will continue until such time as the driven shaft rotates at a speed greater than the speed of the driving shaft at which time the dentil teeth 64, 66 will cam apart and overrun in a normal fashion. At a predetermined speed the centrifugal weight members will be actuated by the centrifugal force generated by the overrunning driven shaft to move the weight means to their radially outermost position against the bias of the springs 69 thereby causing the weight arms 74 to disengage from the intermediate coupling member, thus removing the clutch retarding forces. The spring 76 will then assert itself to return the intermediate coupling member to the starting or declutched position. Operation of the device in the event of a false start will be substantially similar to that described for the previous embodiment.

I claim:

A self-energizing overrunning clutch comprising:

a driving shaft;

a driven shaft in axial alignment with the driving shaft;

a driven clutch member fixedly secured to the driven shaft; said driven clutch member having a first set of teeth;

a driving coupling member secured to the driving shaft; said driving coupling member having a second set of teeth;

an intermediate coupling member slidably journalled on one of said shafts intermediate said driving coupling member and said driven clutch member; said intermediate coupling member having a third and fourth set of teeth axially aligned and cooperative with said first and second set of teeth respectively; said intermediate coupling member having a cylindrical exterior surface;

first spring means for urging said intermediate coupling member away from engagement with the said driven clutch member;

a centrifugal weight member including an axially elongated arm non-rotatably secured to the driven clutch member radially outwardly of said first and third sets of teeth, said weight member being adapted for radial movements; and second spring means for biasing said weight member radially inwardly whereby said elongated arm frictionally engages with the cylindrical exterior surface causing said second and fourth sets of teeth to cam apart towards partial engagement on rotation, and thereby axially displacing said intermediate coupling member, and engaging said first and third sets of teeth.

References Cited by the Examiner

UNITED STATES PATENTS

| 2,535,017 | 12/1950 | Miller. | |
| 2,919,001 | 12/1959 | Miller | 192—104 |
| 2,937,731 | 5/1960 | Smith | 192—104 |
| 3,016,122 | 1/1962 | Miller | 192—104 |
| 3,181,673 | 5/1965 | Poliseo | 192—103 |

DAVID J. WILLIAMOWSKY, *Primary Examiner.*

BENJAMIN W. WYCHE, III, *Assistant Examiner.*